US012428264B2

(12) United States Patent
Witczak et al.

(10) Patent No.: US 12,428,264 B2
(45) Date of Patent: Sep. 30, 2025

(54) ELEVATOR MANAGEMENT SYSTEM THAT TRANSMITS COMBINED OPERATIONAL AND POSITION DATA TO AN ELEVATOR MANAGEMENT CENTER

(71) Applicant: Otis Elevator Company, Farmington, CT (US)

(72) Inventors: Tadeusz Pawel Witczak, Farmington, CT (US); Craig Bogli, Avon, CT (US); Nikola Trcka, West Hartford, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 1424 days.

(21) Appl. No.: 16/883,361

(22) Filed: May 26, 2020

(65) Prior Publication Data

US 2021/0371239 A1 Dec. 2, 2021

(51) Int. Cl.
*B66B 5/00* (2006.01)
*B66B 1/34* (2006.01)
*B66B 5/02* (2006.01)

(52) U.S. Cl.
CPC .......... *B66B 5/0031* (2013.01); *B66B 1/3453* (2013.01); *B66B 1/3461* (2013.01); *B66B 5/0025* (2013.01); *B66B 5/02* (2013.01)

(58) Field of Classification Search
CPC ... B66B 5/0031; B66B 1/3453; B66B 1/3461; B66B 5/0025; B66B 5/02; B66B 5/0018; B66B 1/30; B66B 1/3423; B66B 5/06
See application file for complete search history.

(56) References Cited

U.S. PATENT DOCUMENTS 5,975,247 A 11/1999 Choi
6,892,861 B2 5/2005 Friedli
(Continued)

FOREIGN PATENT DOCUMENTS

CN 102085990 6/2011
CN 107128759 A 9/2017
(Continued)

OTHER PUBLICATIONS

European Search Report Issued in European Application No. 20215785.5-1017 dated May 26, 2021; 9 Pages.
(Continued)

*Primary Examiner* — Jeffrey Donels
(74) *Attorney, Agent, or Firm* — CANTOR COLBURN LLP

(57) ABSTRACT

Disclosed is an elevator system, including a gateway configured to: receive, from an elevator car controller of an elevator car, car controller data for the elevator car that includes a car positional log of the elevator car; receive, from a beacon mounted to the elevator car, car operational data for the elevator car that includes car and door data representing car and door events; and transmit, to one of an elevator management center and a cloud service, a combination of the car controller data and the car operational data to identify an alert condition and a position of the elevator car during the alert condition, wherein the gateway or the one of the elevator management center and the cloud service is configured to stitch together the car controller data and the car operational data to identify the alert condition and position of the elevator car during the alert condition.

13 Claims, 4 Drawing Sheets

(56) References Cited

U.S. PATENT DOCUMENTS

| | | | | |
|---|---|---|---|---|
| 7,721,852 | B2 | 5/2010 | Ishioka et al. | |
| 8,540,057 | B2 | 9/2013 | Schuster et al. | |
| 8,678,143 | B2 | 3/2014 | Bunter | |
| 8,688,664 | B2 | 4/2014 | Pineau et al. | |
| 9,114,953 | B2 | 8/2015 | Mason | |
| 9,266,699 | B2 | 2/2016 | Ogava et al. | |
| 9,481,548 | B2 | 11/2016 | Siddiqui et al. | |
| 10,017,355 | B2 | 7/2018 | Silvennoinen et al. | |
| 10,308,477 | B2 | 6/2019 | Patel | |
| 11,076,338 | B2 | 7/2021 | Witczak et al. | |
| 2018/0257906 | A1 | 9/2018 | Siikonen et al. | |
| 2018/0346283 | A1 | 12/2018 | Scoville et al. | |
| 2019/0202659 | A1 | 7/2019 | Sudi et al. | |
| 2019/0300336 | A1* | 10/2019 | Witczak | B66B 1/468 |
| 2019/0367325 | A1 | 12/2019 | Pahlke | |
| 2019/0373341 | A1* | 12/2019 | Witczak | B66B 1/3461 |
| 2019/0373530 | A1 | 12/2019 | Witczak et al. | |
| 2019/0382235 | A1 | 12/2019 | Pahlke et al. | |
| 2019/0382237 | A1* | 12/2019 | Witczak | B66B 3/002 |
| 2019/0382239 | A1* | 12/2019 | Witczak | B66B 1/3407 |
| 2019/0393950 | A1* | 12/2019 | Oggianu | H04B 7/15507 |
| 2020/0002125 | A1 | 1/2020 | Liaskas et al. | |
| 2020/0031611 | A1 | 1/2020 | Mahoney et al. | |
| 2020/0031620 | A1 | 1/2020 | Herkel et al. | |
| 2020/0052929 | A1* | 2/2020 | Pahlke | B66B 5/0006 |
| 2020/0062539 | A1 | 2/2020 | Carriero | |
| 2020/0062541 | A1 | 2/2020 | Vuorenala et al. | |
| 2020/0062542 | A1 | 2/2020 | Sudi | |
| 2020/0071126 | A1 | 3/2020 | Sudi et al. | |
| 2020/0087111 | A1* | 3/2020 | Wos | B66B 1/3461 |
| 2020/0109027 | A1 | 4/2020 | Witczak et al. | |
| 2020/0109029 | A1* | 4/2020 | Pahlke | B66B 5/0087 |
| 2020/0122964 | A1* | 4/2020 | Sudi | B66B 5/0018 |
| 2020/0180905 | A1* | 6/2020 | Witczak | B66B 5/0018 |

FOREIGN PATENT DOCUMENTS

| | | | | |
|---|---|---|---|---|
| CN | 109052083 | A | 12/2018 | |
| CN | 110127484 | | 8/2019 | |
| CN | 110572197 | A | 12/2019 | |
| CN | 110830941 | A | 2/2020 | |
| EP | 0609205 | B1 | 4/1997 | |
| EP | 3578492 | A1 | 12/2019 | |
| EP | 3795524 | A1 * | 3/2021 | B66B 1/14 |
| EP | 3650385 | B1 * | 11/2022 | B66B 1/2408 |

OTHER PUBLICATIONS

Chinese Office Action; Issued: Dec. 5, 2022; Application No. 202011387909.9; Filed: Dec. 2, 2020; 9 pages.

* cited by examiner

ELEVATOR MANAGEMENT SYSTEM THAT TRANSMITS COMBINED OPERATIONAL AND POSITION DATA TO AN ELEVATOR MANAGEMENT CENTER

BACKGROUND

The disclosed embodiments relate to elevator management systems and more specifically to an elevator management system that transmits combined operational and position data to an elevator management center.

In an elevator management system, information coming from car mounted information of things (IoT) sensors may need to be related to a car position in a hoistway for example on which floor doors were open, or where the condition based maintenance (CBM) data is coming from. However, establishing the position based on single sensors such as accelerometer is difficult and can be less precise for longer runs due to accelerometer drift.

SUMMARY

Disclosed is an elevator system, including a gateway configured to: receive, from an elevator car controller of an elevator car that is operationally positioned in a hoistway of a building, car controller data for the elevator car that includes a car positional log of the elevator car in the hoistway; receive, from a beacon mounted to the elevator car, car operational data for the elevator car that includes car and door data representing car and door events; and transmit, to one of an elevator management center and a cloud service, a combination of the car controller data and the car operational data to identify an alert condition and a position of the elevator car in the hoistway during the alert condition, wherein the gateway or the one of the elevator management center and the cloud service is configured to stitch together the car controller data and the car operational data to identify the alert condition and position of the elevator car during the alert condition.

In addition to one or more features of the system, or as an alternate, the car controller data and the car operational data are both timestamped so that stitching together the car controller data and the car operational data identifies the alert condition and position of the elevator car during the alert condition.

In addition to one or more features of the system, or as an alternate, the beacon communicates wirelessly with the gateway; and the gateway communicates wirelessly with the one of the elevator management center and the cloud service.

In addition to one or more features of the system, or as an alternate, the elevator car controller communicates wirelessly with the beacon via a service tool. In addition to one or more features of the system, or as an alternate, the service tool communicates wirelessly with the controller via a wireless dongle. In addition to one or more features of the system, or as an alternate, the service tool is a mobile phone or tablet.

In addition to one or more features of the system, or as an alternate, mounted to the elevator car, that communicate by wired or wireless connections with the beacon, wherein the car and door data includes sensor detected data and beacon detected data.

In addition to one or more features of the system, or as an alternate, to identify the alert condition: the sensor data is processed, in whole or part, by one or more of: one of more of the sensors; the beacon; the gateway; the elevator management center; and the cloud service; and the beacon detected data is processed, in whole or part, by one or more of: the beacon; the gateway; the elevator management center; and the cloud service.

In addition to one or more features of the system, or as an alternate, the sensors are configured to sense one or more of elevator car speed, current draw, door loading, leveling, position, acceleration, and vibration; and/or the beacon is mounted on or near an elevator car door of the elevator car to detect a number of door openings of elevator doors per hoistway landing, and elevator car starts and stops.

Further disclosed is a method of monitoring an elevator system, including receiving by a gateway, from an elevator car controller of an elevator car that is operationally positioned in a hoistway of a building, car controller data for the elevator car that includes a car positional log of the elevator car in the hoistway; receiving by the gateway, from a beacon mounted to the elevator car, car operational data for the elevator car that includes car and door data representing car and door events; transmitting, by the gateway to one of an elevator management center and a cloud service, a combination of the car controller data and the car operational data to identify an alert condition and a position of the elevator car in the hoistway during the alert condition; and the gateway or the one of the elevator management center and the cloud service stitching together the car controller data and the car operational data to identify the alert condition and position of the elevator car during the alert condition.

In addition to one or more features of the method, or as an alternate, the method includes timestamping the controller data and the car operational data so that stitching together the car controller data and the car operational data identifies the alert condition and position of the elevator car during the alert condition.

In addition to one or more features of the method, or as an alternate, the method includes the beacon communicating wirelessly with the gateway; and the gateway communicating wirelessly with the one of the elevator management center and the cloud service.

In addition to one or more features of the method, or as an alternate, the method includes the elevator car controller communicating wirelessly with the beacon via a service tool. In addition to one or more features of the system, or as an alternate, the service tool communicates wirelessly with the controller via a wireless dongle. In addition to one or more features of the system, or as an alternate, the service tool is a mobile phone or tablet.

In addition to one or more features of the method, or as an alternate, the method includes sensors, mounted to the elevator car, communicating by wired or wireless connections with the beacon, wherein the car and door data includes sensor detected data and beacon detected data.

In addition to one or more features of the method, or as an alternate, the method includes identifying the alert condition by: processing the sensor data, in whole or part, by one or more of: one of more of the sensors; the beacon; the gateway; the elevator management center; and the cloud service; and processing the beacon detected data, in whole or part, by one or more of: the beacon; the gateway; the elevator management center; and the cloud service.

In addition to one or more features of the method, or as an alternate, the method includes the sensors sensing one or more of elevator car speed, current draw, door loading, leveling, position, acceleration, and vibration; and/or the beacon, mounted on or near an elevator car door of the elevator car, detecting a number of door openings of elevator doors per hoistway landing, and elevator car starts and stops.

BRIEF DESCRIPTION OF THE DRAWINGS

The present disclosure is illustrated by way of example and not limited in the accompanying figures in which like reference numerals indicate similar elements.

DETAILED DESCRIPTION

A detailed description of one or more embodiments of the disclosed apparatus and method are presented herein by way of exemplification and not limitation with reference to the Figures.

Figure 1:
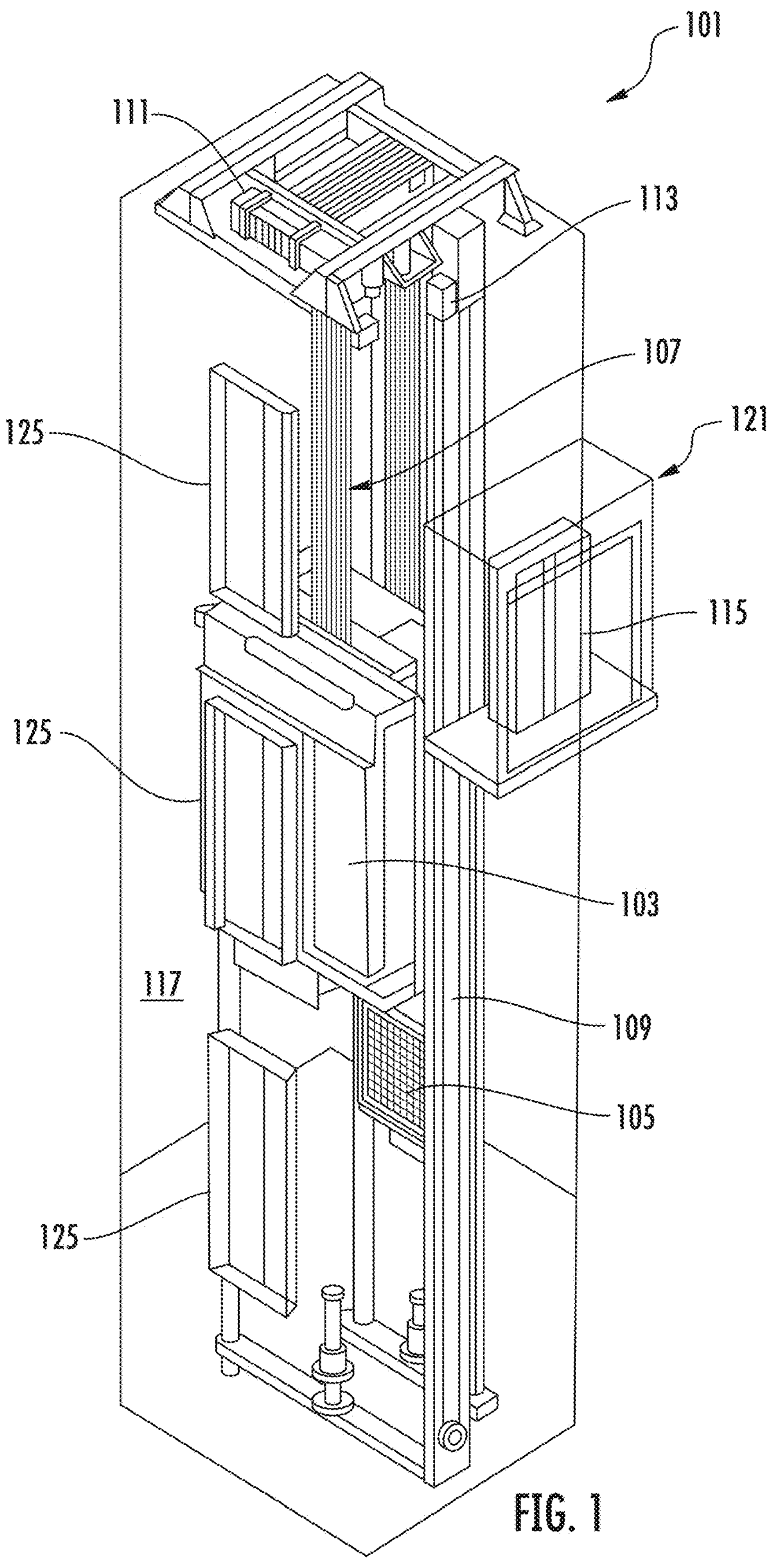
FIG. 1 is a schematic illustration of an elevator system that may employ various embodiments of the present disclosure.

FIG. 1 is a perspective view of an elevator system 101 including an elevator car 103 having an elevator door 104, a counterweight 105, a tension member 107, a guide rail 109, a machine 111, a position reference system 113, and an elevator car controller (controller) 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway (hoistway) 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the hoistway 117, such as on a support or guide rail, and may be configured to provide position signals related to a position of the elevator car 103 within the hoistway 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counterweight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the hoistway 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the hoistway 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within the hoistway 117.

Although shown and described with a roping system including tension member 107, elevator systems that employ other methods and mechanisms of moving an elevator car within an hoistway may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
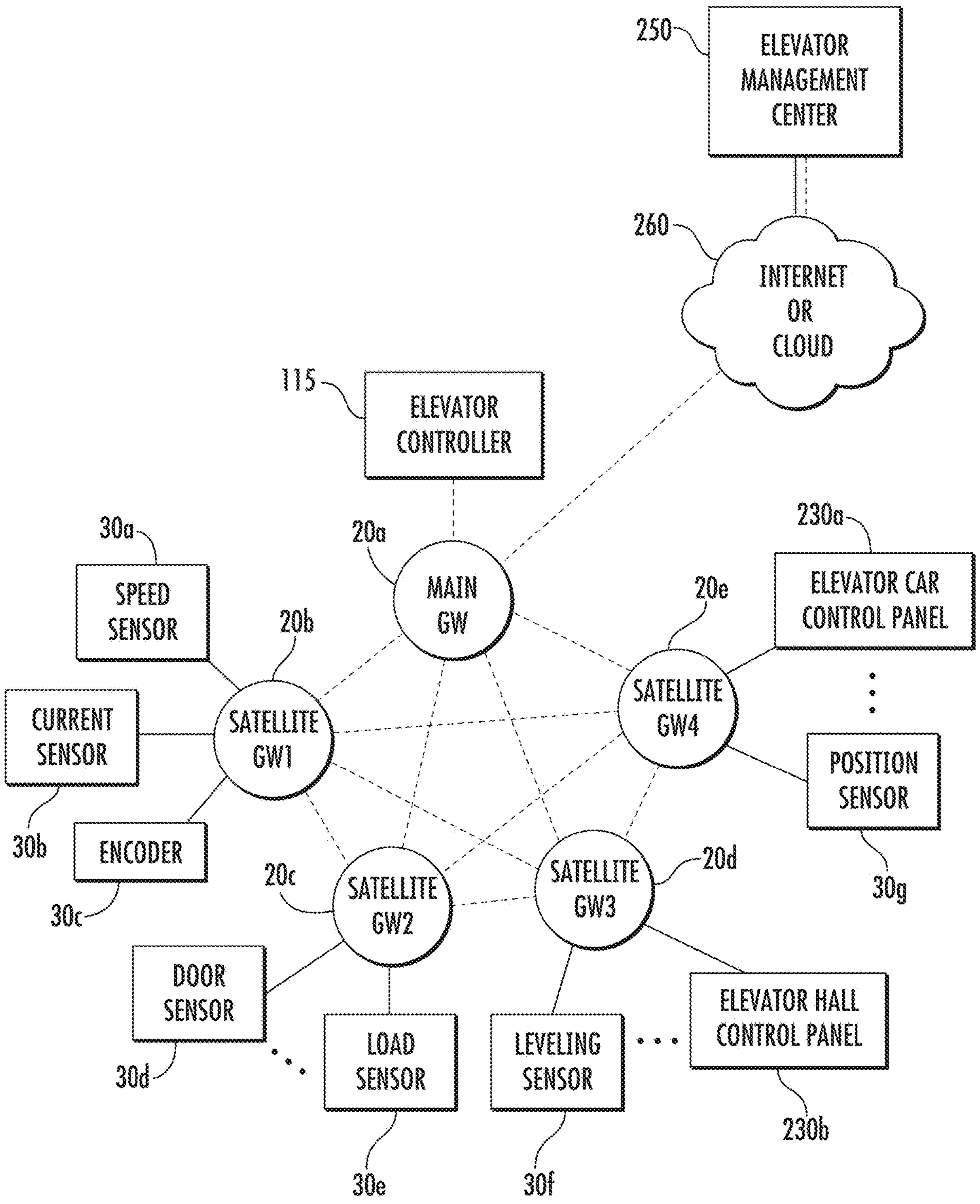
FIG. 2 is a schematic diagram depicting a communication system implemented in an elevator system according to an exemplary embodiment of the invention.

FIG. 2 is a schematic diagram depicting a communication system implemented in an elevator system according to an exemplary embodiment of the invention. The communication system shown in FIG. 2 comprises a main gateway (GW) 20*a* and first to fourth satellite gateways 20*b*-20*e* which are wirelessly connected to each other via a wireless local area network (WLAN). The main gateway 20*a* is connected to an elevator controller 115 and each of the first to fourth satellite gateways 20*b*-20*e* is connected to at least one sensor arranged at a certain place in the elevator system 101 to collect data necessary for operation and management of the elevator system 101. For example, in FIG. 2, the first satellite gateway 20*b* is connected a speed sensor 30*a*, a current sensor 30*b*, and an encoder 30*c*, the second satellite gateway 20*c* is connected to a door sensor 30*d* and a load sensor 30*e*, the third satellite gateway 20*d* is connected with a leveling sensor 30*f* and an elevator hall control panel 230*b*, and the fourth satellite sensor 20*e* is connected with an elevator hall control panel 230*a* and a position sensor 30*g*. The elevator controller panels 230*a*/230*b* may connect with the elevator controller 115 by means of electrical lines (not shown), in particular by an electric bus, e.g. a field bus such as a CAN bus, or by means of wireless data transmission.

The connection between each sensor and each gateway may be wireless or wired. Wireless connections may apply protocols that include local area network (LAN, or WLAN for wireless LAN) protocols and/or a private area network (PAN) protocols. LAN protocols include WiFi technology, based on the Section 802.11 standards from the Institute of Electrical and Electronics Engineers (IEEE). PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols also include Zigbee, a technology based on Section 802.15.4 protocols from the IEEE, representing a suite of high-level communication protocols used to create personal area networks with small, low-power digital radios for low-power low-bandwidth needs. Such protocols also include Z-Wave, which is a wireless communications protocol supported by the Z-Wave Alliance that uses a mesh network, applying low-energy radio waves to communicate between devices such as appliances, allowing for wireless control of the same. Other applicable protocols include Low Power WAN (LPWAN), which is a wireless wide area network (WAN) designed to allow long-range communications at a low bit rates, to enable end devices to operate for extended periods of time (years) using battery power. Long Range WAN (LoRaWAN) is one type of LPWAN maintained by the LoRa Alliance, and is a media access control (MAC) layer protocol for transferring management and application messages between a network server and application server, respectively. Such wireless connections may also include radio-frequency identification (RFID) technology, used for communicating with an integrated chip (IC), e.g., on an RFID smartcard. In addition, Sub 1 Ghz RF equipment operates in the ISM (industrial, scientific and medical) spectrum bands below Sub 1 Ghz—typically in the 769-935 MHz, 315 Mhz and the 468 Mhz frequency range. This spectrum band below 1 Ghz is particularly useful for RF IOT (internet of things) applications. The above is not intended on limiting the scope of applicable wireless technologies. Wireless communications for the disclosed systems include cellular, e.g. 2G/3G/4G (etc.).

Wired connections may include, for example, cables/interfaces conforming to RS (recommended standard)-422, also known as the TIA/EIA-422, a technical standard supported by the Telecommunications Industry Association (TIA) and the Electronic Industries Alliance (EIA) that specifies electrical characteristics of a digital signaling circuit. Wired connections also include cables/interfaces conforming to RS-232, a technical standard for serial communication transmission of data, which defines signals connecting between a DTE (data terminal equipment) such as a computer terminal, and a DCE (data circuit-terminating equipment or data communication equipment), such as a modem. Wired connections may also include cables/interfaces conforming to the Modbus serial communications protocol, managed by the Modbus Organization, which is a master/slave protocol designed for use with programmable logic controllers (PLCs) and which is utilized to connect industrial electronic devices. Wired connections may also include cables/interfaces under the PROFibus (Process Field Bus) standard managed by PROFIBUS & PROFINET International (PI), and is a standard for fieldbus communication in automation technology, published as part of IEC (International Electrotechnical Commission) 61158. Wired communications may also include a Controller Area Network (CAN) bus, utilizing a CAN protocol released by the International Organization for Standards (ISO), which is a standard that allows microcontrollers and devices to exchange messages with each other in applications without a host computer. The above is not intended on limiting the scope of applicable wired technologies.

As described above, the elevator controller 115 is configured to control operation of the elevator system by, e.g. controlling the machine 111. In one embodiment, the ones of the sensors 30*a*-30*g* communicates directly with the main gateway 20*a* while others of the sensors 30*a*-30*g* communicate with the satellite gateways 20*b*-20C. In one embodiment all of the sensors 30*a*-30*g* communicate directly with the main gateway 20*a*.

It is to be understood that the configuration depicted in FIG. 2 is exemplary. In other words, there is no limitation in the number of sensors which are connected with each of the main gateway 20*a* and the satellite gateways 20*b*-20*d*. For example, it may also be possible for one main gateway or one satellite gateway to be connected with one sensor or one controller. In addition, there may be other types of sensors or controllers arranged somewhere in the elevator system 101. As another example, at least one sensor like a temperature sensor may be connected to the main gateway 20.

In FIG. 2, each of the sensors 30*a*-30*g*, the elevator controller 115 and the elevator control panel 230*a* collects data according to its intended purpose. For example, the speed sensor 31*a* measures a speed of an elevator car 103 in the elevator system 101, the current sensor 30*b* detects a working current of a motor used in the elevator system 101, and the encoder 30*c* detects a rotation speed of the motor, etc. The data collected by each of the sensors 30*a*-30*g*, the elevator controller 115, the elevator control panel 230*a* is transferred to a corresponding gateway, i.e. one of the main gateway 20*a* and the first to fourth gateways 20*b*-20*d* which is connected with the sensor transferring the data. In one embodiment in addition to or in place of one of the sensors 30*a*-30*g*, an accelerometer is used to detect accelerations and/or vibrations.

Each of the satellite gateways 20*b*-20*e* receiving the data from a corresponding sensor or controller performs a predefined data processing on the received data and transfers the resulting data to the main gateway 20*a* via the WLAN. Alternatively, it may also be possible for the satellite gateways 20*b*-20*e* to transfer the data received from the sensors or controllers to the main gateway 20*a* without data processing.

Figure 3B:
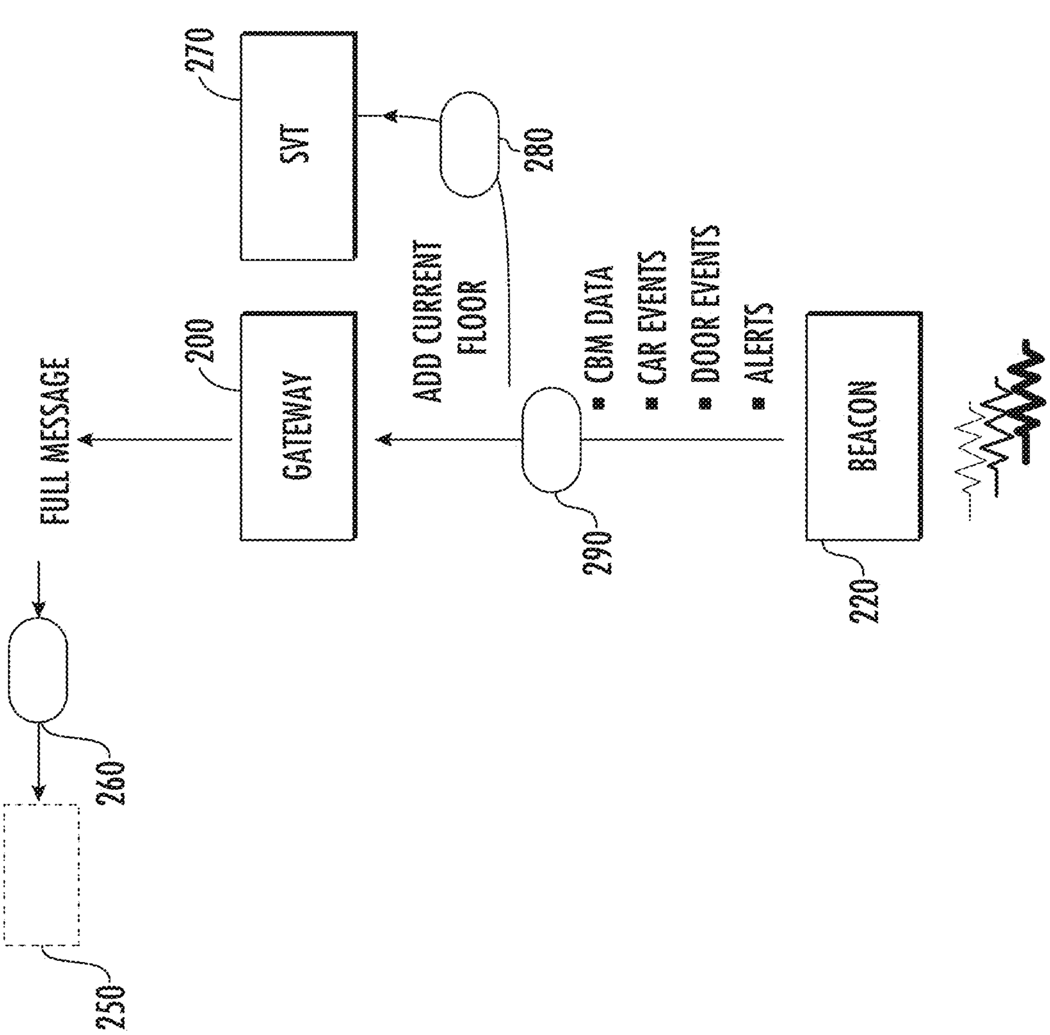
FIG. 3B is a data flow diagram for a communication system associated with the elevator system according to an embodiment.

The WLAN, as indicated, may be any of a Bluetooth Low Energy (BLE), a Sub-1 GHz RF, a Low-Power Wide-Area Network (LPWAN) including narrowband internet of things (NB-IOT) and Category M1 internet of things (Cat M1-IOT), and a Low-Range Wide-Area-Network (LoRaWAN). The main gateway 20*a* and the satellite gateways 20*b*-20*e* may perform edge computing. Instead of transferring all obtained raw data, each of the main gateway 20*a* and the satellite gateways 20*b*-20*e* performs the predefined data processing with the raw data and the processed data is transferred to the main gateway 20*a*. For example, in FIG. 2, all speed data detected by the speed sensor 30*a* does not need to be delivered to the elevator management center 250 (FIG. 3B) via the main gateway 20*a*. Instead, the first satellite gateway 20*b* connected to the speed sensor 30*a* may be configured to transmit data only when the measured speed exceeds a predetermined threshold. For the edge computing, each of the main gateway 20*a* and the satellite gateways 20*b*-20*e* needs to be equipped with a data processor necessary for performing the predefined data processing. From the edge computing, real-time data processing near the source of data, i.e. a sensor, is possible and thereby the entire volume of data to be delivered through the network can be significantly decreased. The main gateway 20*a* is configured to pass the received data to the elevator management center 250 via the Internet or the cloud system 260 (FIG. 3B).

Figure 3A:
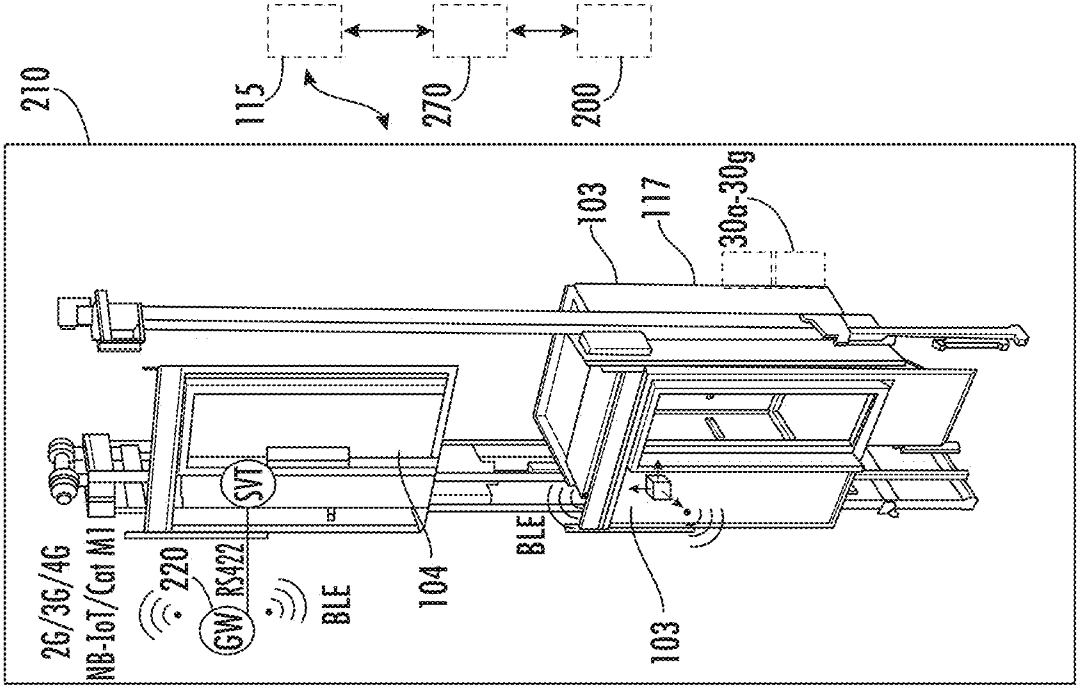
FIG. 3A is another schematic illustration of the elevator system that may employ various embodiments of the present disclosure.

FIG. 3A is another schematic illustration of the elevator system that may employ various embodiments of the present disclosure. FIG. 3B is a data flow diagram for a communication system associated with the elevator system according to an embodiment. As shown in FIGS. 3A and 3B, the elevator system 101 may include a gateway 200, which may be any gateway 20*a*-20*d* shown in FIG. 2, which may also be located in the controller room 121. For simplicity, the gateway 200 of FIG. 3A may be construed as the main gateway 20*a* of FIG. 2.

The gateway 200 may be configured to communicate with a controller 115 of the elevator car 103 that is operationally positioned in the hoistway 117 of a building 210. From this communication, the gateway 200 may receive car controller data. The car controller data may include a car positional log that identifies a time-based positioning of the elevator car 103 in the hoistway 117. The position is, for example, relative to a level (floor) in the hoistway 117.

The gateway 200 is configured to communicate with a beacon 220 mounted to the elevator car 103 to receive car operational data. The car operational data may include car and door data representing time-based car and door events. In one embodiment, the beacon 200 may include a wireless transceiver with edge-computing capabilities. These wireless communications may be based on one or more of the protocols and standards identified above.

In one embodiment, the beacon 220 may communicate with each of the sensors 30*a*-30*g* to obtain, as part of the car operational data, data related to elevator car speed, current draw, door loading, leveling, position, acceleration, vibrations. The connection between the beacon 220 and the sensors 30*a*-30*g* may also be wired or wireless based on one of the protocols and standards identified above. The beacon 220 may also detect car and door events, for the car and door data, including a number of door openings of elevator doors 104 per hoistway landing, and elevator car starts and stops.

In one embodiment, the beacon 220 may be able to process the car operational data against predetermined thresholds to identify alert conditions, which may be transmitted to the gateway 200. In one embodiment, the sensors 30*a*-30*g* may be configured for edge computing and may be able to process sensor data against predetermined thresholds to identify alert conditions. In such embodiment the beacon 220 may transmit to the gateway 220 the alert conditions identified by the sensors 30*a*-30*g* and alert conditions it (the beacon 220) identifies from the detected car and door events.

In one embodiment, the beacon 220 may transmit, unprocessed, some or all of the sensor and detected data to the gateway 200. In such embodiment, the gateway 200 may process the data to identify alert conditions. In one embodiment, the gateway 200 may transmit, unprocessed, some or all of the sensor and beacon detected data to the elevator management center 250 or the cloud service 260 to process the data and identify alert conditions.

In one embodiment the car operational data transferred by the beacon 220 to the gateway 200 includes condition based maintenance (CBM) data. The gateway 200 may transmit this data to the elevator management center 250 or the cloud service 260. The CBM data may be obtained by the beacon 220 while acting on the senor and beacon detected data. Condition based maintenance (sometimes referred to as condition based monitoring) is maintenance that is performed when a need arises. CBM is part of an industry based predictive maintenance effort, enabled by artificial intelligence (AI) technologies and connectivity abilities. CBM is performed after one or more indicators (e.g. from the collected data) show that equipment is going to fail or that equipment performance is deteriorating. CBM may be applicable to mission-critical systems that incorporate active redundancy and fault reporting. CBM may also be applicable to non-mission critical systems that lack redundancy and fault reporting. CBM is based on using real-time data to prioritize and optimize maintenance resources, e.g., to determine equipment health, and act when maintenance is necessary. CBM utilizes instrumentation (such as the sensors) together with analytical tools to enable maintenance personnel to decide the right time to perform maintenance on equipment. CBM may minimize spare parts cost, system downtime and time spent on maintenance.

In one embodiment, the gateway 200 stitches the car controller data with the car operational data, that is then sent to the elevator management center 250 or the cloud service 260. In one embodiment, the gateway 200 transmits the car controller data with the car operational data to the elevator management center 250 or the cloud service 260, which stitches the data together. The stitching may be based on timestamps in the different sets of data. In one embodiment, the gateway 200, elevator management center 250 or cloud service 260 may be configured to synchronize the stitched data to identify alert conditions and exact locations of the elevator 103 by time.

In one embodiment, the gateway 200 may be configured to communicate with the controller 115 to obtain car controller data every few seconds to every few minutes. The gateway 200 may be configured to communicate with the beacon 220 every few seconds to every few minutes to obtain car operational data. The gateway 200 may be configured to transmit data to elevator management center 250 or cloud service 260 multiple times an hour, such as every ten minutes. This way, the data sent to the elevator management center 250 or cloud service 260 may contain sufficient sets of data that may be either stitched together for identifying a time and exact location of alert conditions.

In one embodiment, the gateway 200 may be configured to wirelessly communicate with the controller 115 via a smart service tool (SSVT) 270 to obtain the car controller data. That is, a Service Tool (SVT) is a known device that allows a mechanic to obtain and modify information from within the elevator controller. Information to be viewed or modified may be parameter settings, such as duration timers, max elevator speed, addresses for each hall call button, etc. Information viewed may also be fault logs, such as time-stamped occurrences of communication errors, stuck doors, faulty switches, etc. Information viewed may also be event logs, such as time-stamped occurrences of activity events like door opened, door closed, car moved up, car parked, etc. A Smart Service Tool (SSVT) is a known device that has increased capabilities as compared with the SVT. For example, SSVT is based on technology in a smart phone so it has additional connectivity options. In some implementations, the SSVT is executable software on a mobile device such as a mobile phone or tablet. Additionally, there is the ability to add more functions to the SSVT than what is on the traditional SVT. Such capabilities include being able to store and forward large amounts of data, including for example an elevator event log (e.g., which may store timestamped events), a list of all parameter settings from the elevator controller, and the ability to store a new/updated software/firmware images that will be installed in the elevator controller. For the SSVT to perform these functions, it may need to communicate with elevators controllers (such as legacy controllers) via a wired SVT port connection, which may utilize RS422 compliant connectors (or wired connectors compliant with any other one of the wired specifications identified in this disclosure). With such controllers, the use of a wireless adaptor (dongle) may facilitate the connection. Other controllers may be equipped for wireless communications, which enable for a wireless communications with the SSVT applying any one of the wireless protocols identified in this disclosure.

According to the embodiments, the SSVT 270 may be used as a pass-through connection device to synchronize the gateway 200 and beacon 220, or pass relevant information from one to the other. These communications may occur when a mechanic is on the jobsite, with the SSVT 2270 nearby. Alternatively, the gateway 200 may communicate with the elevator controller 115 equipped with a wireless transceiver (e.g., wireless dongle), as indicated above. Through this wireless connection, the gateway 200 may obtain the information that would normally be obtained through the wired connection with the SVT.

Figure 4:
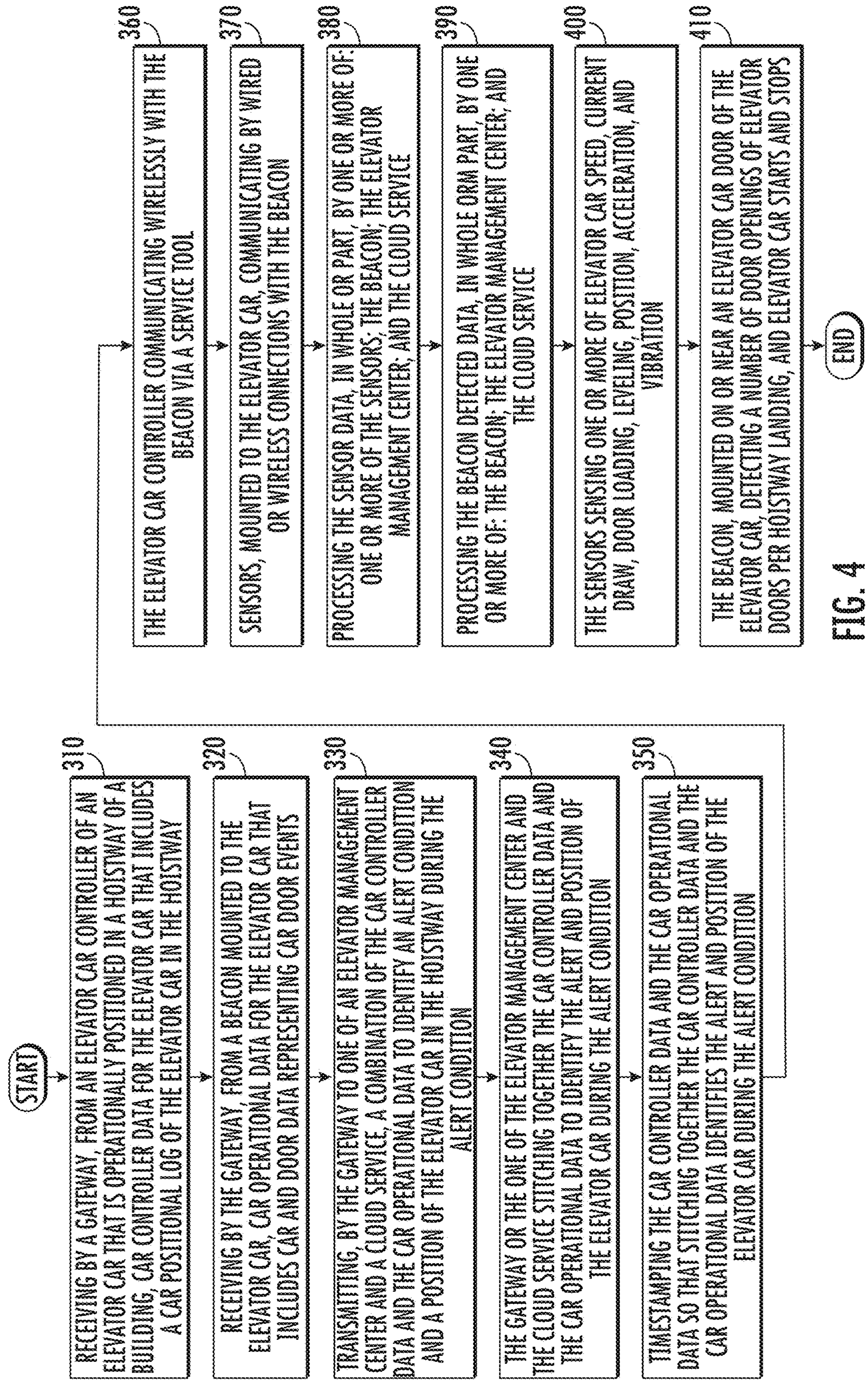
FIG. 4 is a flowchart showing a method of monitoring an elevator system according to an embodiment.

Turning to FIG. 4, a flowchart shows a method of monitoring an elevator system 101. As shown in block 310, the method may include receiving by the gateway 200, from the elevator car controller 115 of the elevator car 103 that is operationally positioned in the hoistway 117 of the building 210 via one or more of the wireless protocols identified above, car controller data for the elevator car 103 that includes a car positional log of the elevator car 103 in the hoistway 117. As shown in block 320, the method may include receiving by the gateway 200, from the beacon 220 mounted to the elevator car 103 via one or more of the wireless protocols identified above, car operational data for the elevator car 103 that includes car and door data representing car and door events. As shown in block 330, the method may include transmitting, by the gateway 200 to one of the elevator management center 250 and the cloud service 260 via one or more of the wireless protocols identified above, a combination of the car controller data and the car operational data to identify an alert condition and a position of the elevator car 103 in the hoistway 117 during the alert condition.

As shown in block 340, the method may include the gateway 200 or the one of the elevator management center 250 and the cloud service 260 stitching together the car controller data and the car operational data to identify the alert condition and position of the elevator car 103 during the alert condition.

As shown in block 350 the method may include timestamping the car controller data and the car operational data so that stitching together the car controller data and the car operational data may identify the alert condition and position of the elevator car during the alert condition.

As shown in block 360 the method may include the elevator car controller 115 communicating wirelessly with the beacon 200 via the service tool 270, via one or more of the wireless protocols identified above. As indicated the service tool 270 may communicate with the elevator controller via a wireless dongle. More specifically, the service tool may be a mobile phone or tablet.

As shown in block 370, the method may include the sensors 30*a*-30*g*, mounted to the elevator car 103, communicating by wired or wireless connections with the beacon 220, via connections complying with one or more of the wired and wireless standards and protocols identified above. As indicated the car and door data includes sensor detected data and beacon detected data.

As shown in block 380, the method may include identifying the alert condition by processing the sensor data, in whole or part, by one or more of: one of more of the sensors 30*a*-30*g*; the beacon 220; the gateway 200; the elevator management center 250; and the cloud service 260. The processing on the sensor 30*a*-30*g* and beacon 220 may be, for example, via edge computing. As shown in block 390, the method may include identifying the alert condition by processing the beacon detected data, in whole or part, by one or more of: the beacon 220; the gateway 200; the elevator management center 250; and the cloud service.

As shown in block 400, the method may include the sensors 30*a*-30*g* sensing one or more of elevator car speed, current draw, door loading, leveling, position, acceleration, and vibration. As shown in block 410, the method may include the beacon 220, mounted on or near the elevator car door 104 of the elevator car 103, detecting a number of door openings of elevator doors per hoistway landing, and elevator car starts and stops.

With the disclosed embodiments, the controller knowledge about precise car position is leveraged to ensure correct labeling of beacon readings with car position in the hoistway. The disclosed embodiments include: a system where smart device is connected to the controller and a beacon is mounted on the car; the smart device reads a car position from the controller; a beacon detects and collects information on car and door actions, for example, a number of door openings at the landing, car start, car stop, CBM data for door cycles/runs; the beacon sending data related to event to a gateway; the gateway attaching the an identified car position to the message; and a smart device adding additional data from the controller to the message sent to the beacon, for example, an event log and a load weighing system. This would provide information about the load inside the elevator car (empty, lightly loaded, fully loaded).

Benefits of the disclosed embodiments include reliable CBM data, due timestamping events with car position; and a precise car positioning system, as the controller knows a car position with exacting (millimeter) accuracy. Additionally, the disclosed embodiments may provide for a relatively simpler elevator car commissioning process, there may be no need for calibrating sensors to learn run locations. Further, a discrepancy between what an on-board sensor position logic determines and the actual location based on the controller may enable fine-tuning an overall fleet-wide position algorithm to be used on elevators, e.g., without controller information.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An elevator system, comprising
a gateway configured to:
receive, from an elevator car controller of an elevator car that is operationally positioned in a hoistway of a building, car controller data for the elevator car that includes a car positional log of the elevator car in the hoistway;
receive, from a beacon mounted to the elevator car, car operational data for the elevator car that includes car and door data representing car and door events; and
transmit, to one of an elevator management center and a cloud service, a combination of the car controller data and the car operational data to identify an alert condition and a position of the elevator car in the hoistway during the alert condition,
wherein the gateway is configured to stitch together the car controller data and the car operational data to identify the alert condition and position of the elevator car during the alert condition, wherein:
the car controller data and the car operational data are both timestamped so that stitching together the car controller data and the car operational data identifies the alert condition and position of the elevator car during the alert condition;
wherein sensors are mounted to the elevator car, each of the sensors communicate by wired or wireless connections with the beacon, wherein the car and door data includes sensor detected data and beacon detected data;
wherein the sensors are configured to sense one or more of elevator car speed, current draw, door loading, leveling, position, acceleration, and vibration; and
wherein the beacon is mounted on or near an elevator car door of the elevator car to detect a number of door openings of elevator doors per hoistway landing, and elevator car starts and stops.

2. The elevator system of claim 1, wherein:
the beacon communicates wirelessly with the gateway; and
the gateway communicates wirelessly with the one of the elevator management center and the cloud service.

3. The elevator system of claim 2, wherein:
the elevator car controller communicates wirelessly with the beacon via a service tool.

4. The elevator system of claim 3, wherein:
the service tool communicates with the controller via a wireless dongle.

5. The elevator system of claim 4, wherein:
the service tool is a mobile phone or tablet.

6. The elevator system of claim 1, wherein, to identify the alert condition:
the sensor data is processed, in whole or part, by one or more of:
one of more of the sensors; the beacon; the gateway; the elevator management center; and the cloud service; and
the beacon detected data is processed, in whole or part, by one or more of:
the beacon; the gateway; the elevator management center; and the cloud service.

7. The elevator system of claim 6, wherein:
the sensors are configured to sense one or more of elevator car speed, current draw, door loading, leveling, position, acceleration, and vibration; and/or
the beacon is mounted on or near an elevator car door of the elevator car to detect a number of door openings of elevator doors per hoistway landing, and elevator car starts and stops.

8. A method of monitoring an elevator system, comprising
receiving by a gateway, from an elevator car controller of an elevator car that is operationally positioned in a hoistway of a building, car controller data for the elevator car that includes a car positional log of the elevator car in the hoistway;
receiving by the gateway, from a beacon mounted to the elevator car, car operational data for the elevator car that includes car and door data representing car and door events;
transmitting, by the gateway to one of an elevator management center and a cloud service, a combination of the car controller data and the car operational data to identify an alert condition and a position of the elevator car in the hoistway during the alert condition; and
the gateway stitching together the car controller data and the car operational data to identify the alert condition and position of the elevator car during the alert condition; and
timestamping the car controller data and the car operational data so that stitching together the car controller data and the car operational data identifies the alert condition and position of the elevator car during the alert condition;
wherein sensors, mounted to the elevator car, communicate by wired or wireless connections with the beacon, wherein the car and door data includes sensor detected data and beacon detected data;
wherein the sensors sense one or more of elevator car speed, current draw, door loading, leveling, position, acceleration, and vibration; and
the beacon, mounted on or near an elevator car door of the elevator car, detects a number of door openings of elevator doors per hoistway landing, and elevator car starts and stops.

9. The method of claim 8, comprising:
the beacon communicating wirelessly with the gateway; and
the gateway communicating wirelessly with the one of the elevator management center and the cloud service.

10. The method of claim 9, comprising:
the elevator car controller communicating wirelessly with the beacon via a service tool.

11. The method of claim 10, wherein:
the service tool communicates wirelessly with the controller via a wireless dongle.

12. The method of claim 11, wherein:
the service tool is a mobile phone or tablet.

13. The method of claim 8, comprising identifying the alert condition by:

processing the sensor data, in whole or part, by one or more of:

one of more of the sensors; the beacon; the gateway; the elevator management center; and the cloud service; and processing the beacon detected data, in whole or part, by one or more of:

the beacon; the gateway; the elevator management center; and the cloud service.

* * * * *